(No Model.)

H. T. WILSON & B. B. SANDERS.

CHURN.

No. 314,501. Patented Mar. 24, 1885.

Witnesses.
Louis F. Gardner
A. S. Pattison

Inventors.
H. T. Wilson,
B. B. Sanders,
per
F. A. Lehmann,
atty.

UNITED STATES PATENT OFFICE.

HOMER TONY WILSON AND BLEUFORD BRADFORD SANDERS, OF DALLAS, TEXAS.

CHURN.

SPECIFICATION forming part of Letters Patent No. 314,501, dated March 24, 1885.

Application filed May 13, 1884. (No model.)

*To all whom it may concern:*

Be it known that we, HOMER T. WILSON and BLEUFORD B. SANDERS, of Dallas city, in the county of Dallas and State of Texas, have invented certain new and useful Improvements in Rotary Churns; and we do hereby declare the following to be a full, clear, and exact description of the invention, such as will enable others skilled in the art to which it pertains to make and use it, reference being had to the accompanying drawings, which form part of this specification.

Our invention relates to an improvement in rotary churns; and it consists in the combination of the dasher-shaft made screw-threaded at its upper end, and having a dasher secured to its lower one; a pinion which is applied to the screw-threaded part of the shaft, and which has a rising and falling movement thereon; the driving-wheel which operates the two pinions, and through them the two dashers, and the sleeve, which is connected to the lower pinion and one of the dashers, as will be more fully described hereinafter.

The object of our invention is to provide an automatic mechanism in connection with one of the dashers, so that after the churning is completed it is only necessary to reverse the movement of the driving-wheel, when one of the dashers will automatically be thrown out of gear and remain stationary, so that the remaining dasher can be used in gathering the butter.

Figure 1:
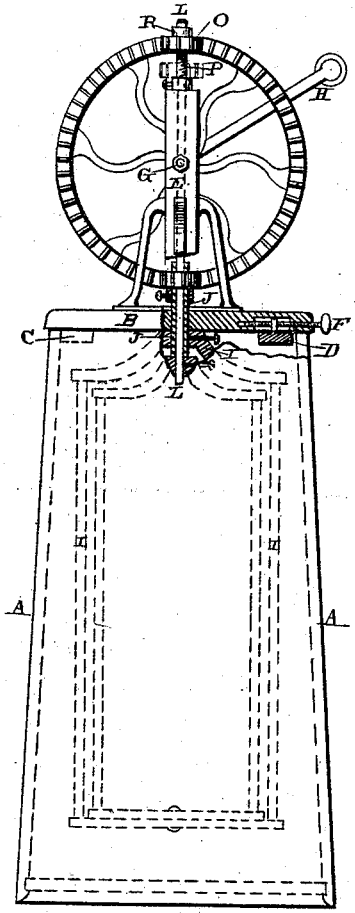
Figure 2:
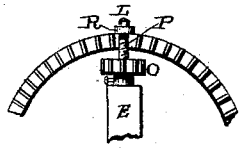

Figure 1 is a side elevation of a churn embodying our invention, shown partly in section. Fig. 2 shows the wheel which is to be thrown out of gear with the driving-wheel in the separated position.

A represents the body of the churn, and B the cover. This cover is fastened tightly in position upon the churn by means of the stationary piece C, which is secured to its under side, and the movable piece D, which is moved horizontally back and forth by the set-screw F. Upon the top of this cover is secured a suitable standard or frame-work, E, upon which is journaled the driving-shaft G, which is operated by means of the handle H. One of the dashers, I, is connected to the sleeve J, while the second dasher is connected to the vertical shaft L in the usual manner. This sleeve and shaft are provided with pinions which mesh with the driving-wheel, so as to cause the two dashers to revolve in opposite directions in the usual manner.

No special claim is made upon the dashers, which are to revolve in opposite directions, for the sleeve, the shaft, the pinions on the sleeve and shaft for gearing with the operating-wheel are conceded to be old. The great trouble with this form of churn is that as the two dashers, as heretofore made, always revolve together they must be removed from the churn when the churning is completed, for the purpose of gathering the butter. Our special aim has been to overcome this defect, and to so construct the parts that one of the dashers can be made to remain stationary and the other made to revolve, for the purpose of gathering the butter. For this purpose the upper end of the shaft which passes through the sleeve, and which has the pinion O secured to its upper end, is made screw-threaded, as shown at P, so that the pinion O will automatically follow these threads when the motion of the wheel is reversed, and thus be forced downward upon the shaft and out of gear with the driving-wheel when its motion is reversed. When both dashers are to be revolved together, the pinion O is first moved up by hand until its upper edge engages with the teeth of the driving-wheel, and then, when the driving-wheel is turned toward the right, this pinion follows the threads and moves upward upon the shaft until it strikes against the under side of the nut R, which is rigidly secured to the upper end of the shaft, and then the shaft begins to revolve and operate the dasher connected to its lower end. As soon, however, as the operator wishes to gather the butter, after the churning is completed, it is is only necessary to reverse the motion of the driving-wheel, when the pinion will follow the threads upon the shaft and move down out of gear with the driving-wheel. By removing the set-screws the dashers can be detached from their shaft for the purpose of being washed.

Having thus described our invention, we claim—

In a churn, the combination of the frame E, the driving-wheel which meshes with both pinions, the shaft P, having its upper end screw-threaded and provided with a stop, the pinion O, placed upon the screw-threaded portion of the shaft, and having a rising and falling movement thereon, the lower pinion, sleeve, and two dashers which revolve in opposite directions, substantially as shown.

In testimony whereof we affix our signatures in presence of two witnesses.

HOMER TONY WILSON.
  BLEUFORD BRADFORD SANDERS.

Witnesses:
 J. H. SKILES,
 W. M. C. HILL.